US012791298B2

(12) United States Patent
Geiger et al.

(10) Patent No.: US 12,791,298 B2
(45) Date of Patent: Nov. 10, 2026

(54) TEMPERATURE CORRECTION FOR DIMENSIONAL MEASUREMENT

(71) Applicant: Carl Zeiss Industrielle Messtechnik GmbH, Oberkochen (DE)

(72) Inventors: Johannes Geiger, Nattheim (DE); Tobias Perkuhn, Heidenheim (DE); Alwine Schroll, Schechingen (DE); Matthias Wahl, Korb (DE); Sabrina Rau, Koenigsbronn (DE); Malte Langmack, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 435 days.

(21) Appl. No.: 18/496,904

(22) Filed: Oct. 29, 2023

(65) Prior Publication Data

US 2024/0142213 A1 May 2, 2024

(30) Foreign Application Priority Data

Oct. 28, 2022 (DE) ............................ 102022128729

(51) Int. Cl.
*G01B 5/012* (2006.01)
*G01K 1/02* (2021.01)
(Continued)

(52) U.S. Cl.
CPC ............. *G01B 5/012* (2013.01); *G01K 1/026* (2013.01); *G01K 15/007* (2013.01); *H05B 3/0033* (2013.01)

(58) Field of Classification Search
CPC ...... G01K 1/026; G01K 15/007; G01B 5/012; G01B 21/045; G01B 9/02055; H05B 3/0033
(Continued)

(56) References Cited

U.S. PATENT DOCUMENTS 4,808,009 A * 2/1989 Sittler ...................... G01F 1/699 374/25
7,188,432 B2 * 3/2007 Schepperle .......... G01B 5/0014 33/503
(Continued)

FOREIGN PATENT DOCUMENTS

DE 29511744 U1 10/1995
DE 10138138 A1 2/2003
(Continued)

OTHER PUBLICATIONS

Schalz, K.J.: Thermo-Vollfehler-Korrektur für Koordinaten-Meßgeräte; Feinwerktechnik & Messtechnik, edition 98, No. 10, Oct. 1, 1990.

*Primary Examiner* — Peter J Macchiarolo
*Assistant Examiner* — Anna Josephine Saunders
(74) *Attorney, Agent, or Firm* — Miller Johnson

(57) ABSTRACT

A measurement device includes a measurement head configured to capture dimensional measurement data of a measurement object. A guide structure is configured to move and guide at least one of the measurement head and the measurement object in a measurement volume of the measurement device. A measurement unit is configured to capture positional data of the guide structure based on which a pose of the measurement head can be calculated. Multiple temperature sensor units are configured to capture temperature data about the measurement volume. Each temperature sensor unit includes a carrier element, a temperature sensor connected to the carrier element, and a heating element connected to the carrier element. A control system is configured to process the dimensional measurement data and the positional data and, based on the temperature data, correct at least one of the dimensional measurement data and the positional data.

14 Claims, 5 Drawing Sheets

(51) Int. Cl.
*G01K 15/00* (2006.01)
*H05B 3/00* (2006.01)

(58) Field of Classification Search
USPC .............................................................. 33/503
See application file for complete search history.

(56) References Cited

U.S. PATENT DOCUMENTS

| | | | | |
|---|---|---|---|---|
| 7,537,963 | B2 * | 5/2009 | Bernitz | H01G 4/224<br>438/107 |
| 8,231,266 | B2 * | 7/2012 | Schulze | G01K 15/00<br>374/208 |
| 8,919,005 | B2 * | 12/2014 | Mamour | G01B 5/012<br>33/503 |
| 9,658,118 | B2 * | 5/2017 | Charles | G01K 15/005 |
| 2010/0158073 | A1 * | 6/2010 | Marks | G01K 15/00<br>374/E7.018 |
| 2013/0097882 | A1 * | 4/2013 | Bridges | G01B 11/005<br>33/503 |
| 2021/0191359 | A1 * | 6/2021 | Iseli | G01B 21/045 |
| 2024/0142213 | A1 * | 5/2024 | Geiger | H05B 3/0038 |

FOREIGN PATENT DOCUMENTS

| | | | | |
|---|---|---|---|---|
| DE | 10356367 | A1 | 7/2005 | |
| DE | 102017006454 | B4 | 1/2019 | |
| DE | 102019134019 | A1 | 6/2021 | |
| EP | 2142878 | B1 | 1/2010 | |
| EP | 4124821 | A1 * | 2/2023 | G01B 5/0014 |

* cited by examiner

TEMPERATURE CORRECTION FOR DIMENSIONAL MEASUREMENT

CROSS-REFERENCE TO RELATED APPLICATIONS

This application claims priority to German patent application DE 10 2022 128 729, filed on Oct. 28, 2022, the entire contents of which are incorporated by reference.

FIELD

This disclosure relates to a measurement device for dimensionally measuring a measurement object located in a measurement volume of the measurement device. This disclosure further relates to a method for dimensionally measuring a measurement object located in a measurement volume. This disclosure still further relates to a computer program product.

BACKGROUND

Coordinate measuring machines serve for checking workpieces, for example as part of quality assurance, or for ascertaining the geometry of a workpiece completely as part of what is known as "reverse engineering." Moreover, diverse further application possibilities are conceivable, such as e.g. process-controlling applications, in which the dimensional measurement technology is applied directly for online monitoring and online regulation of manufacturing and processing processes.

In coordinate measuring machines, different types of sensors may be used to capture the object (measurement object) to be measured. These sensors are typically arranged on a measurement head of the coordinate measuring machine. In addition to the actual sensors, the associated probe elements are also mounted on this measurement head. Depending on the type of sensor, these probe elements can be, for example, one or more tactile styli or optical elements of an optical measurement sensor.

In the case of tactile measurement sensors, the measurement object is probed in a tactile manner at a plurality of defined points. Optical sensors, on the other hand, enable contactless capturing of the coordinates of a measurement object. There are also what are known as multi-sensor systems, in which a plurality of tactile and/or optical sensors are used together.

The high precision requirements that are placed on coordinate measuring machines in practice have meant that it has been possible over the years to constantly increase their measurement accuracy through various developments. The measurement accuracy of some prior-art coordinate measuring machines is now a few tenths of a micrometer or even less.

It is easy to understand that in this measurement accuracy range, external environmental influences bring about disruptive factors that negatively influence the measurement accuracy. Under laboratory conditions, environmental influences, such as externally acting forces or temperature changes, can be minimized as much as possible. However, if the coordinate measuring machine is used close to production, this is much more difficult to accomplish.

Temperature fluctuations, for example caused by switching internal heat sources, such as electronic components, lamps, motors, etc., on or off, lead for example to rotation and length changes of the device structure of the coordinate measuring machine. Furthermore, fluctuations in the ambient temperature can also be coupled into the overall system of the coordinate measuring machine and in this way cause further thermal "distortions." The consequence of the rotation and length changes that occur and of the thermal distortions is that the measurement object "wanders off" or "drifts." This has a direct influence on the accuracy of the coordinate measuring machine.

Various approaches for correcting the thermal influences mentioned in coordinate measuring machines are already known from the prior art. Example methods for correcting a temperature error during a measurement with a coordinate measuring machine are known from the following publication, Schalz, K. J.: "Thermo-Vollfehler-Korrektur für Koordinaten-Meßgeräte" [Thermal full error correction for coordinate measuring machines], in Feinwerktechnik & Meßtechnik, vol. 98, no. 10, Oct. 1, 1990; US 2021/191359 A1 and DE 101 38 138 A1.

In the aforementioned methods, a consistent attempt is made to collect temperature data with the aid of a plurality of temperature sensors and to mathematically correct the thermally induced deformations of the measurement device based on the temperature data supplied by the temperature sensors.

One way to correct thermal deformations resulting from internal and external heat sources is to use what is known as a temperature-strain correction. Here, temperature sensors are fixed at significant locations on the measurement device. The temperature sensors serve to approximate an overall temperature field acting on the structure of the measurement device. If the connection between the temperature field and the strain field is stored in a model, the thermal deformation at different structural points or structural elements on the measurement device can be predicted and corrected mathematically.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to the solutions previously known from the prior art, the temperature sensors used for this purpose are generally adhesively bonded in place at different positions on the measurement device. The temperature signals generated by the temperature sensors are sent to the evaluation and control unit of the measurement device, in which the temperature data are evaluated and processed.

In practice, the following disadvantages arise in particular:

(1) Ensuring that the temperature sensors are always positioned in the same way is usually only possible with a lot of effort or is not possible at all in practice. Yet clear sensor positioning at a defined location is essential for the robust and good functioning of a mathematical temperature correction. It is easy to understand that fluctuations in sensor positioning and orientation result in fluctuations in the quality of the correction.

(2) With a relatively large number of and/or relatively long supply lines, the temperature sensors currently used for the aforementioned purposes are extremely difficult to handle and very difficult to distinguish from one another.

(3) The assignment of the individual temperature sensors to the respective location or position on the measurement device also constitutes a not insignificant problem.

(4) A temperature sensor can become detached from the measurement device, in particular if adhesive bonds are used. In that case, the temperature sensor measures the ambient temperature of the measurement device instead of the temperature of the respective structural element of the measurement device. This also results in a correction distortion and thus in inaccuracies in the correction result.

(5) When using multiple temperature sensors, it is often extremely difficult to check the functionality and directly assign the error (e.g. a defective cable or a defective interface) to the respective temperature sensor.

It is an object to provide a measurement device and also a corresponding method and a computer program product with which the aforementioned problems can be overcome. In particular, it is an object to improve the type of mounting of the temperature sensors, to simplify their assignment, and to be able to check their correct mounting more easily in order to ultimately be able to better mathematically compensate for temperature-induced deformations of the measurement device.

According to a first aspect, a measurement device for dimensionally measuring a measurement object located in a measurement volume of the measurement device is presented, wherein the measurement device includes:

- a measurement head, which is configured to capture dimensional measurement data of the measurement object;
- a guide structure, which is configured to move and guide the measurement head and/or the measurement object in the measurement volume,
- a measurement unit which is configured to capture positional data of the guide structure, based on which a pose of the measurement head can be calculated;
- a plurality of temperature sensor units, which are configured to capture temperature data about the measurement volume; and
- an evaluation and control unit, which is configured to process the dimensional measurement data and the positional data and to correct the dimensional measurement data and/or the positional data based on the temperature data,
- wherein each of the temperature sensor units includes a carrier element, a temperature sensor connected to the carrier element, and a heating element connected to the carrier element.

According to a second aspect, a method for dimensionally measuring a measurement object located in a measurement volume is presented, including:

- capturing dimensional measurement data of the measurement object with a measurement head of a measurement device,
- capturing positional data with which a pose of the measurement head can be calculated;
- capturing temperature data about the measurement volume using a plurality of temperature sensor units, each of which has a carrier element, a temperature sensor connected to the carrier element, and a heating element connected to the carrier element;
- correcting the dimensional measurement data and/or the positional data based on the temperature data.

According to a third aspect, a computer program product is presented, having a software code that is configured to carry out the following steps when carried out on a computer:

- capturing dimensional measurement data of the measurement object with a measurement head of a measurement device,
- capturing positional data based upon which a pose of the measurement head can be calculated;
- capturing temperature data about the measurement volume with the aid of a plurality of temperature sensor units, each of which includes a carrier element, a temperature sensor connected to the carrier element, and a heating element connected to the carrier element; and
- correcting at least one of the dimensional measurement data and the positional data based on the temperature data.

It is understood that the features defined in the dependent claims and the refinements mentioned in the following description relate not only to the measurement device, but also in a corresponding manner to a use of the measurement device, to the presented method, and to the presented computer program product. For the sake of simplicity, the design options are explained below substantially in relation to the measurement, without explicitly listing the corresponding features again as equivalent method features.

The temperature sensor units used in the measurement device each have a carrier element, a temperature sensor connected to the carrier element, and a heating element connected to the carrier element. This type of sensor structure has various advantages. The carrier element functions as a common carrier structure for the temperature sensor and the heating element. This enables a stable and space-saving arrangement of the temperature sensor. In addition, the temperature sensor can be arranged with the aid of the carrier element in a clearly defined and time-invariable manner at a desired position on the measurement device or its guide structure.

The provision of a heating element which is connected, together with the temperature sensor, to the carrier element of the respective temperature sensor unit also has the advantage that a defect in at least the temperature sensor can be ascertained hereby and/or that it is possible to check whether the temperature sensor unit is correctly mounted on the measurement device. By selectively activating and deactivating the heating elements of the individual temperature sensor units and then evaluating the temperature data supplied by the temperature sensors, it is easy to determine whether a temperature sensor unit or parts thereof is/are defective or if the temperature sensor unit is not mounted correctly.

According to a refinement, the evaluation and control unit is configured to compare the temperature data with a predefined, absolute temperature target value and/or to analyze a temperature profile over time in order to use it to ascertain a defect in at least one of the temperature sensor units; and/or to ascertain incorrect mounting of at least one of the temperature sensor units.

For example, the heating elements of the temperature sensor units are switched on (activated) and switched off (deactivated) again after a predefined period of time. Meanwhile, the temperature data supplied by the temperature sensors, which preferably have time-dependent temperature signals, are evaluated in the evaluation and control unit. If an expected temperature increase is recorded by a temperature sensor in a time interval in which a specific heating element was activated, this can be used to determine relatively clearly whether the respective temperature sensor unit is correctly arranged on the measurement device or not, and/or whether or not the temperature sensor is generally defective.

If the temperature sensor unit has become detached from the measurement device, a different profile of the time-dependent temperature signal can generally be expected than when the temperature sensor unit is correctly mounted on the measurement device.

The heating elements are preferably electrical heating elements. However, it should be noted at this point that any type of electrical consumer can be viewed as a heating element within the present meaning, provided that the respective consumer actively generates heat when activated or switched on. For example, a light source or light-emitting element should therefore also be considered a "heating element" within the present meaning.

According to a further refinement, the temperature sensor units each have a light-emitting element, which is preferably connected to the carrier element of the respective temperature sensor unit. The light-emitting element includes, for example, an LED light-emitting element.

The provision of at least one light-emitting element per temperature sensor unit ensures additional simplification of the assignment of the individual temperature sensors to one another.

Although such a light-emitting element per temperature sensor can be provided separately from the heating element of the respective temperature sensor, the light-emitting element according to a particularly preferred configuration is the heating element of the respective temperature sensor unit. In other words, according to this preferred configuration, provision is made for the temperature sensor units to each have a light-emitting element which, in addition to its pure lighting function, which can serve for the optical detection of the respective temperature sensor, also takes on the function of a heating element. Compared to the previously mentioned configuration of a separate light-emitting element and heating element per temperature sensor unit, this configuration has the advantage of significantly lower costs and at the same time ensures a space-saving design of the temperature sensor unit, since the lighting and heating functions are each implemented by one and the same element.

According to a further refinement, the evaluation and control unit is configured to activate the light-emitting element of the temperature sensor units at mutually offset times This configuration is particularly preferred if the temperature sensors each also have a light-emitting element in addition to the heating elements, or if the heating elements are each designed as light-emitting element.

In addition to the previously mentioned functional tests, an optical assignment of the individual temperature sensor units based on the light-emitting element is then possible. This is particularly advantageous when a large number of temperature sensors are used, since assigning the temperature sensors is often very difficult in such a case.

According to a further refinement, the evaluation and control unit has a plurality of signal channels, wherein each of the signal channels is assigned one of the temperature sensors and wherein each of the signal channels is assigned a second light-emitting element, which is configured to light up when the respective signal channel is activated.

This ensures a further simplification of the optical assignment of the temperature sensors to the individual signal channels of the evaluation and control unit. During the optical check, it is immediately clear, for example, whether the correspondingly selected temperature sensor is assigned to the correct signal channel of the evaluation and control unit. In such a case, the second light-emitting element assigned to the respective signal channel should light up at the same time as the light-emitting element of the selected temperature sensor unit. If the two light-emitting element do not light up synchronously, an incorrect assignment has apparently been selected or the corresponding temperature sensor unit is not correctly connected to the evaluation and control unit.

It goes without saying that this type of assignment can also be carried out automatically by the evaluation and control unit.

According to a further refinement, the carrier element includes a circuit board, and the temperature sensor and the heating element are designed in SMD construction.

This has the advantage that a compact design of the temperature sensor units can be achieved and that the temperature sensor and the heating element and also the light-emitting element (if present) can be easily electrically connected directly to the circuit board. In addition, the circuit board, as a connecting structure, ensures good thermal conductivity, in particular between the temperature sensor and the heating element.

To increase thermal conductivity and reduce any time constants, the circuit board can be coated on one or both sides with a material with high thermal conductivity, for example copper, aluminum, silver, or gold. For space reasons, it is also advantageous that the circuit board is configured to be as small as possible in terms of its geometry.

According to a further refinement, provision is made for the temperature sensor units to each have an attachment element for attaching the carrier element to the measurement device. The attachment element can, for example, include an adhesive, a plug connector, a rivet, or a screw connector. The attachment element particularly preferably includes a screw.

This enables a particularly stable and time-invariable/constant way of mounting the temperature sensors on the measurement device. In particular, this ensures permanently identical positioning of the temperature sensors, which is essential for robust and good functioning of the temperature-related mathematical correction.

According to a further refinement, the attachment element includes a screw connection with a thread and a nut corresponding to the thread.

The nut is configured to lock the thread. This type of connection is particularly advantageous if the carrier element of the respective temperature sensor is non-rotationally connected to the thread, i.e. if rotation of the carrier element of the temperature sensor relative to the thread is excluded. So to mount the temperature sensor, only the nut can then be rotated, whereas the screw, together with the carrier element of the temperature sensor which is non-rotationally connected to it, does not have to be rotated. This reduces the risk of damage to the supply line(s) of the temperature sensor. This configuration also has the advantage that the cable outlet of the sensor can be set at a fixed, defined angular position.

According to a further refinement, the temperature sensor units each have a housing in which the carrier element, the temperature sensor, and the heating element of the respective temperature sensor unit are arranged.

Not only does such a housing have the natural advantage of protecting the components of the temperature sensor unit. In addition, such a housing has the advantage that the temperature of the temperature sensor does not depend too much on external temperature influences. The housing therefore provides a certain degree of thermal shielding. In addition, in the event of activation of the heating element, the housing can ensure a comparatively faster rise in temperature of the remaining components of the temperature sensor unit, as a result of which the aforementioned analyses (ascertainment of a defect in the temperature sensor unit and ascertainment of incorrect mounting of the temperature sensor unit) can be carried out more time efficiently.

According to a further refinement, the temperature sensor units are attached to the measurement head and/or the guide structure.

This enables direct measurement of the temperature data which are necessary for calculating the thermal deformation of the measurement device. In the present case, the guide structure of the measurement device is understood to mean the entire structure of the measurement device which serves to enable the measurement head to be moved relative to the measurement object. Depending on the design of the measurement device, the guide structure can, for example, have a movable measurement stage, one or more cantilever arms, a bridge, a gantry or a stand, or one or more robot arms.

The measurement device includes a measurement head, which is configured to capture dimensional measurement data of the measurement object; a guide structure, which is configured to guide the measurement head and/or the measurement object and to move it in the measurement volume, wherein the guide structure is assigned at least one measurement unit which is configured to capture positional data of the guide structure, based on which a pose of the measurement head can be calculated; a plurality of temperature sensor units, which are configured to capture temperature data about the measurement volume; and an evaluation and control unit, which is configured to process the dimensional measurement data and the positional data and to correct the dimensional measurement data and/or the positional data based on the temperature data.

It goes without saying that the aforementioned features and those yet to be explained below can be used not only in the combination specified in each case but also in other combinations or on their own, without departing from the spirit and scope of the present disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
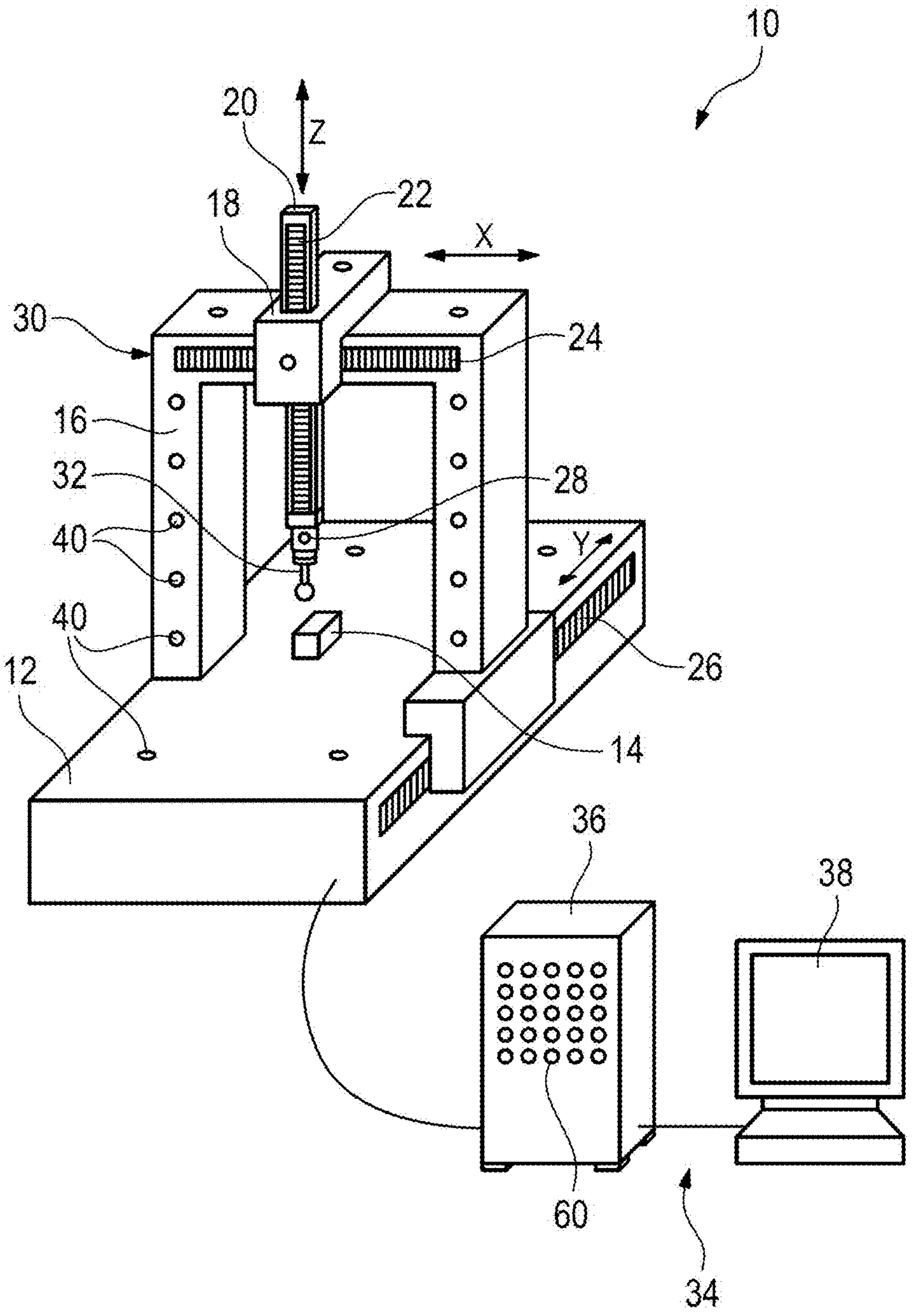
FIG. 1 is a schematic view of a measurement device according to an embodiment.

FIG. 1 shows an example embodiment of the measurement device in a schematic, perspective view. The measurement device is denoted therein in its entirety by the reference sign 10.

The measurement device 10 shown in FIG. 1 is a coordinate measuring machine, which is shown in a simplified form. However, the design of the measurement device 10 should in no way be viewed as restrictive.

The measurement device 10 has a base 12, which includes, for example, a solid granite slab. The base 12 can serve as a holder for a measurement object 14. It is also possible for a movably mounted measurement stage to be arranged on the base 12, on which the measurement object 14 is placed.

Furthermore, a gantry 16 is arranged on the base 12 such that it is movable in the longitudinal direction. The gantry 16 has two columns projecting upward from the base 12, which are connected to one another by a crossbeam and have an inverted U-shape overall.

The direction of movement of the gantry 16 in relation to the base 12 is usually referred to as the Y-direction. A slide 18, which is movable in the transverse direction, is arranged on the upper crossbeam of the gantry 16. This transverse direction is usually referred to as the X-direction. The carriage 18 carries a quill 20, which is movable in the Z-direction, that is to say perpendicularly to the base 12.

Measurement units on the basis of which the X-, Y- and Z-positions of the gantry 16, the carriage 18, and the quill 20 can be determined are denoted by the reference signs 22, 24, 26. In other words, the measurement units 22, 24, 26 serve to capture positional data of the guide structure 30 of the measurement device 10. In the present example embodiment, this guide structure 30 includes the base 12, the gantry 16, the carriage 18, and the quill 20.

Typically, the measurement units 22, 24, 26 have measurement standards, which can be designed, for example, as glass scales that serve as measurement scales. These measurement scales, in conjunction with corresponding reading heads (not shown here), are configured to determine the position of the gantry 16 relative to the base 12, the position of the carriage 18 relative to the gantry 16, and the position of the quill 20 relative to the carriage 18. Based on the positional data of the guide structure 30 captured by the measurement units 22, 24, 26, the pose of a measurement head 28, which is arranged at the lower, free end of the quill 20, can be determined.

The measurement head 28 is configured to capture dimensional measurement data of the measurement object 14. In the example embodiment shown in FIG. 1, the measurement head 28 is a tactile measurement head which has a tactile stylus 32 projecting in the Z direction toward the base. This tactile stylus 32 is configured to probe the surface of the measurement object 14 at a large number of measurement points. During probing the surface of the measurement object 14, the measurement head 28 captures the dimensional measurement data.

The measurement data captured by the measurement head 28 during a measurement are evaluated together with the positional data recorded by the measurement units 22, 24, 26 in an evaluation and control unit 34. The evaluation and control unit 34 determines the spatial coordinates of the probe points on the measurement object 14 from the captured measurement data and positional data. The evaluation and control unit 34 can, for example, be configured to create a model of the measurement object 14 from these spatial coordinates and/or to compare the captured measurement data and positional data with corresponding test data in order to determine whether the shape of the measurement object corresponds to a desired shape. Typically, the evaluation and control unit 34 also serves to control the guide structure 30 for moving the measurement head 28.

The evaluation and control unit 34 has a computing unit 36, which is preferably designed as a computer on which corresponding measurement software is stored, with the aid of which a measurement can be carried out automatically or controlled manually by an operator. In addition to the computing unit 36, the evaluation and control unit 34 includes a display device 38, which is preferably designed as a screen or other display.

The measurement device 10 also has a plurality of temperature sensor units 40, which are configured to capture temperature data about the measurement volume of the measurement device 10. The temperature sensor units 40 are attached to the guide structure 30 and the measurement head 28 distributed at different positions. Each of these temperature sensor units 40 includes a temperature sensor 42 (see FIGS. 2-5), which can be designed, for example, as an NTC thermistor or as a PTC thermistor. Alternatively, other types of resistive temperature sensors or optical temperature measurement sensors can also be used as temperature sensors 42 in the temperature sensor units 40.

The evaluation and control unit 34 is configured to evaluate the measurement data captured by the measurement head 28 and the positional data captured by the measurement units 22, 24, 26 and to correct the measurement data and/or the positional data based on the temperature data captured by the temperature sensors 42. The evaluation and control unit 34 carries out a mathematical correction, by means of which temperature-induced deformations of the measurement head 28 and/or of the guide structure 30 are compensated for in order to increase the measurement accuracy. Typically, the temperature-induced deformation of the guide structure 30 is many times greater than the temperature-induced deformation of the measurement head 28 simply due to its size. Depending on the embodiment and configuration of the measurement device 10, it is still conceivable to mathematically compensate for both the temperature-induced deformation of the guide structure 30 and the temperature-induced deformation of the measurement head 28.

The method described in the European patent application with the application number 21 188 853.2, for example, can be used as a mathematical correction method that is implemented in the evaluation and control unit 34.

Figure 2:
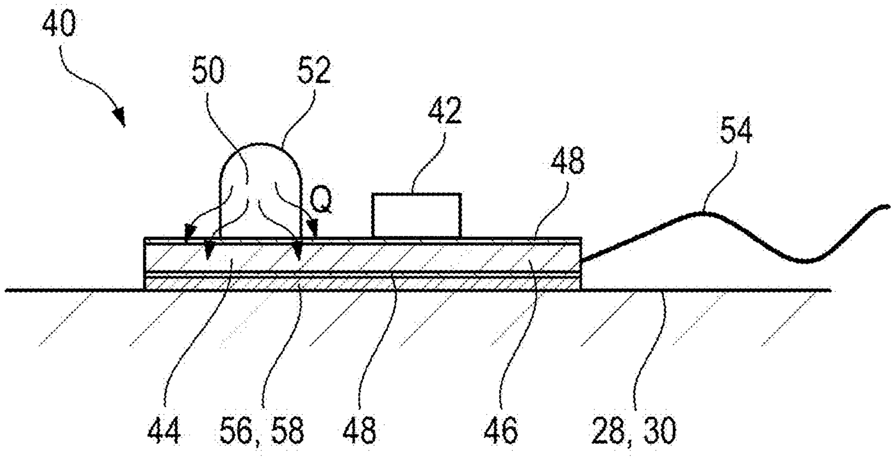
FIG. 2 is a schematic illustration of a temperature sensor and an illustration of the mounting of the temperature sensor according to a first embodiment.

FIG. 2 shows a schematic view of one of the temperature sensor units 40 according to a first example embodiment. The temperature sensor 42 is attached to a carrier element 44. The carrier element 44 includes a circuit board 46, which both functions as a mechanical carrier for the temperature sensor 42 and serves to electrically connect the temperature sensor 42.

The temperature sensor 42 is electrically connected to corresponding conductor tracks provided for this purpose on the circuit board 46. The temperature sensor 42 is preferably designed as an SMD component (surface-mounted device component). An SO (small outline), an SOP (small outline package) or a TO (transistor outline) design is particularly preferably chosen. For example, the temperature sensor can be installed in an SOP 8 or a TO92 semiconductor housing.

The circuit board 46 can be coated with a material with high thermal conductivity, for example copper, aluminum, silver or gold, to increase thermal conductivity and to reduce any time constants. In the example embodiment shown in FIG. 2, the circuit board 46 is coated on both sides with such a coating 48. The coating should be applied in such a way that it does not have a negative effect on the conductor tracks of the circuit board 46 and, for example, cause a short circuit.

Furthermore, a heating element 50 is arranged on the circuit board 46 serving as a carrier element 44. The heating element 50 here includes a light-emitting element 52, which is preferably designed as an LED light-emitting element. The light-emitting element 52 is electrically connected via corresponding conductor tracks provided on the circuit board 46.

Preferably, at least one cable 54 connected to the circuit board 46 serves for the electrical connection of the temperature sensor unit 40. The respective temperature sensor unit 40 is connected to the evaluation and control unit 34 via this cable 54.

The evaluation and control unit 34 is configured to process and evaluate the temperature data supplied by the individual temperature sensors 42. The temperature data of the individual temperature sensors 42 are preferably digital signals that are temperature-dependent, so that the evaluation and control unit 34 can calculate a time-dependent temperature profile for each individual temperature sensor 42 from these digital signals.

The evaluation and control unit 34 is also configured to control the heating elements 50 or light-emitting element 52 of the individual temperature sensor units 40 in order to selectively switch them on and off. In the example embodiment shown in FIG. 2, the light-emitting element 52 forms the heating element 50 of the respective temperature sensor unit 40. When switched on, the light-emitting element 52 should therefore introduce so much heat Q into the carrier element 44 or the circuit board 46 that it can be measured by the temperature sensor 42 after a defined time. If this is not ensured, it is also possible not to use the light-emitting element 52 itself as a heating element 50, but to use an additional thermal resistor that emits sufficient heat Q when current flows through it. In this case, the aforementioned thermal resistor (not shown) would form the heating element 50.

In order to use the effect of the heating up as efficiently as possible, it is preferred that the heating element 50 is arranged in spatial proximity to the temperature sensor 42. In the example embodiment shown in FIG. 2, the heating element 50 and the temperature sensor 42 are therefore arranged next to each other on the same side of the circuit board 46. It may even be advantageous to apply the heating element 50 directly to a pin of the temperature sensor 42 to further enhance the effect.

The temperature sensor unit 40 further includes an attachment element 56 for attaching the carrier element 44 to the guide structure 30 or to the measurement head 28 of the measurement device 10. In the example embodiment shown in FIG. 2, the attachment element 56 includes an adhesive layer 58.

Figure 3:
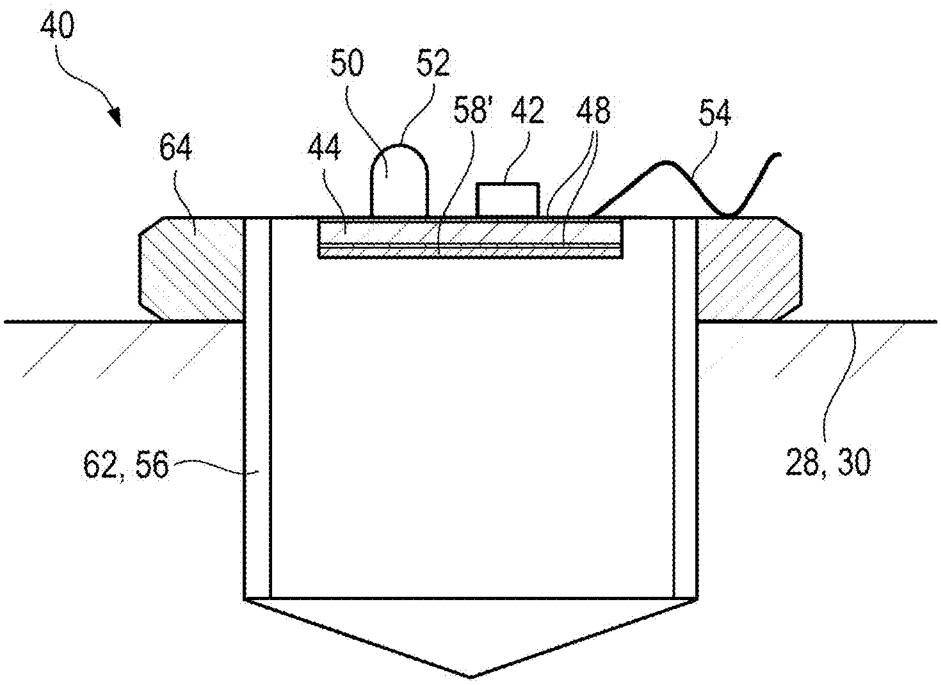
FIG. 3 schematic illustration of a temperature sensor and an illustration of the mounting of the temperature sensor according to a second embodiment.
Figure 4:
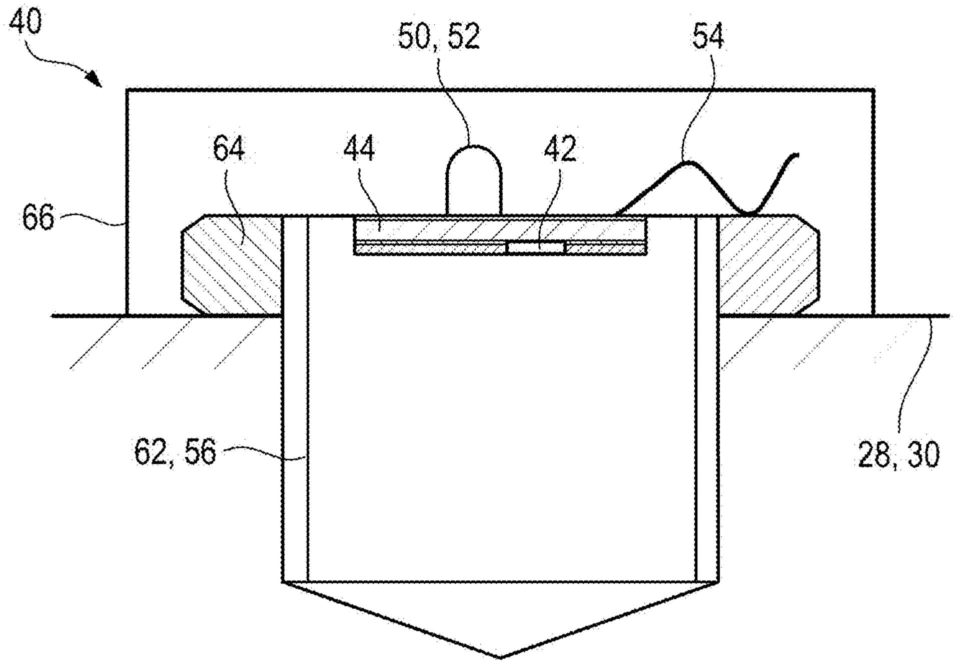
FIG. 4 schematic illustration of a temperature sensor and an illustration of the mounting of the temperature sensor according to a third embodiment.
Figure 5:
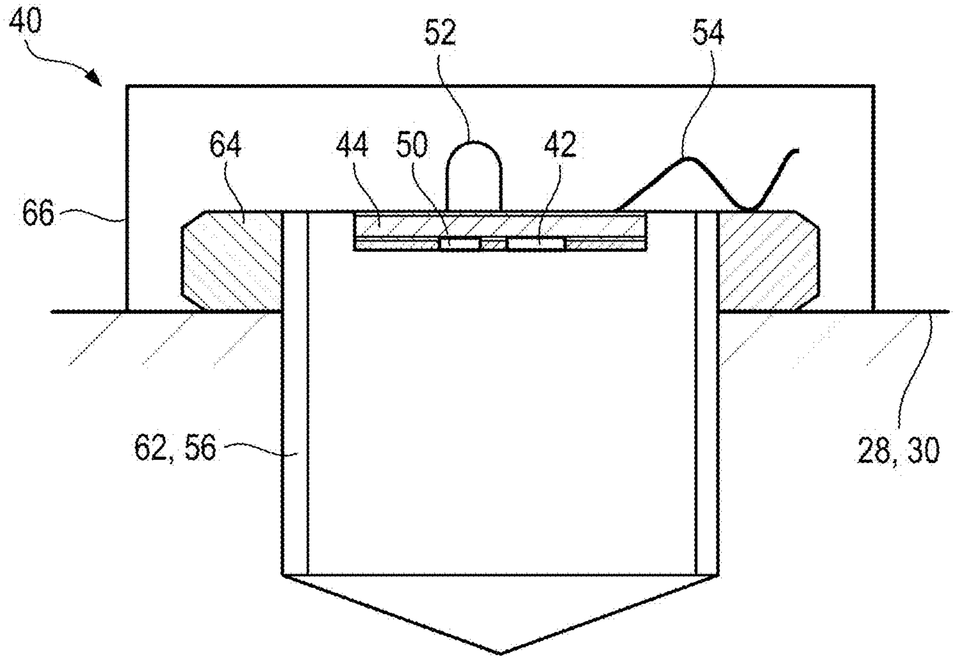
FIG. 5 is a schematic illustration of a temperature sensor and an illustration of the mounting of the temperature sensor according to a fourth embodiment.

FIGS. 3-5 show further example embodiments of a temperature sensor unit 40. In the embodiment shown in FIG. 3, a screw connection with a thread 62 is selected as the attachment element 56, instead of a pure adhesive bond. The carrier element 44 is connected to the thread 62 non-rotationally. This is preferably achieved in that the carrier element 44 is attached to the screw on which the thread 62 is arranged. To attach the carrier element 44 to the screw, an adhesive layer 58', but also another suitable type of attachment can be selected. The screw or thread 62 is preferably countered by a nut 64. This has in particular the advantage that the screw itself does not need to be turned and damage to the connecting cable 54 is thereby effectively avoided.

It is understood that other types of attachment element 56 can also be selected to attach the carrier element 44 to the measurement device 10. For example, it is possible to use a lining element in conjunction with a spring, a rivet connection or a clamping connection for this purpose. The only important thing is that a permanently identical positioning of the temperature sensor unit 40 on the machine structure of the measurement device 10 is ensured.

FIG. 4 shows a further example embodiment of a temperature sensor unit 40. The example embodiment shown in FIG. 4 differs from the example embodiment shown in FIG. 3 in that a housing 66 is additionally provided, which at least partially surrounds the carrier element 44, the temperature sensor 42, and the heating element 50. The housing 66 acts as a type of thermal shield to reduce external temperature influences and increase the accuracy of the temperature measurement of the temperature sensor 42.

In addition, in the example embodiment shown in FIG. 4, the temperature sensor 42 is arranged on the underside of the carrier element 44 so that it is in direct contact with the attachment element 56. This can be advantageous in order to increase the accuracy of the temperature measurement. In such a case, however, it is necessary that the heat conduction between the heating element 50 and the temperature sensor 42 continues to be ensured.

To improve the last-mentioned effect, the heating element 50 in the example embodiment shown in FIG. 5 is formed separately from the light-emitting element 52. For example, in this case the heating element 50 is a separate thermal resistor, which is arranged together with the temperature sensor 42 on the underside of the carrier element 44.

In the example embodiments shown in FIGS. 4 and 5, the housing 66 is preferably configured to be transparent or at least partially transparent (at least not opaque), so that the light-emitting element 52 is also visible from outside the housing 66. If no light-emitting element 52 is provided, the housing 66 can also be configured to be completely opaque.

Figure 7:
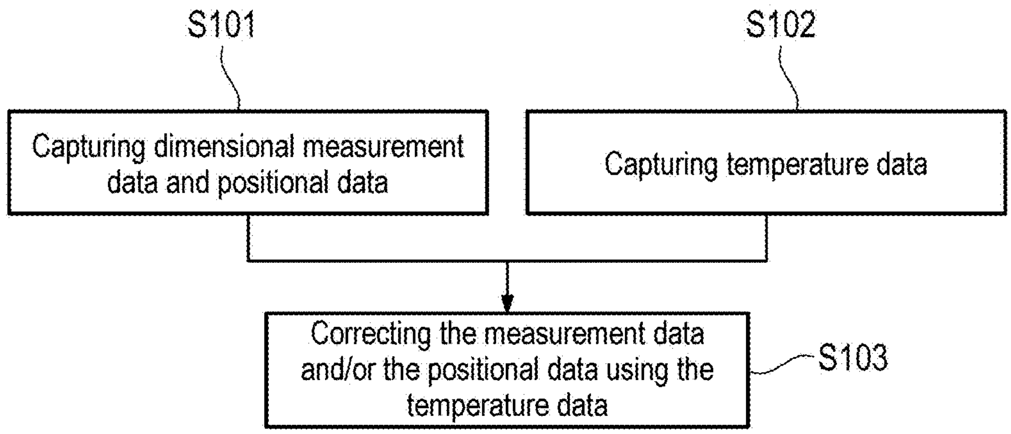
FIG. 7 is a schematic block diagram to illustrate the method in accordance with an example embodiment.

When the heating element 50 is switched off, the temperature sensor 42 measures relatively precisely the temperature of that part of the measurement device 10 on which the temperature sensor unit 40 is arranged. Depending on the arrangement, the temperature sensor 42 thus measures the respective part of the guide structure 30 or of the measurement head 28 to which the temperature sensor unit 40 is attached. Accordingly, when the heating element 50 is switched off, the temperature correction method, which is shown schematically in FIG. 7, can be carried out.

For this purpose, the evaluation and control unit 34 captures the dimensional measurement data of the measurement object 14 with the aid of the measurement head 28 in a first method step S101. At the same time, the evaluation and control unit 34 meanwhile captures the positional data of the measurement head 28 from the measurement units 22, 24, 26. The evaluation and control unit 34 also captures the temperature data supplied by the temperature sensors 42 (step S102). The captured dimensional measurement data, positional data, and temperature data are evaluated in the evaluation and control unit 34. In method step S103, the evaluated measurement data and/or positional data are ultimately corrected based on the temperature data. In this method step S103, the temperature-induced deformation of the measurement head 28 and/or of the guide structure 30 is taken into account, with the result that the measurement data and/or positional data are corrected in accordance with the mathematical correction method depending on the temperature data.

Figure 8:
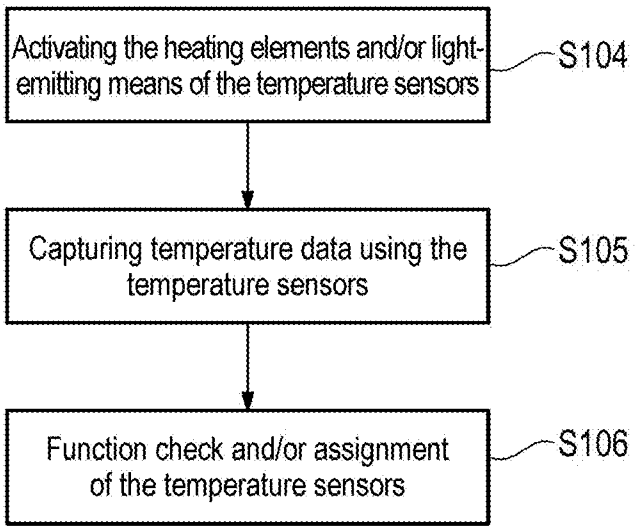
FIG. 8 is a schematic block diagram to illustrate the method or the use of the measurement device in accordance with the example embodiment.

With the aid of the heating elements 50 provided in the temperature sensor units 40, it is also possible to carry out a functional check of the temperature sensor units 40. The process of the functional check is shown as an example and schematically in FIG. 8.

To carry out the functional check, the evaluation and control unit 34 can, for example, be configured to activate the heating elements 50 of the temperature sensor units 40 and to leave them switched on for a predefined period of time so that they produce this heat Q (step S104). To detect this heat Q emitted by the heating elements 50, the evaluation and control unit 34 captures the temperature data from the temperature sensors 42 during this period (step S105). Based on the temperature data captured in step S105, the evaluation and control unit 34 can ascertain a defect in one of the temperature sensor units 40 through appropriate evaluation and/or determine that one of the temperature sensor units 40 has not been correctly mounted. For this purpose, the evaluation and control unit 34 evaluates the temperature data captured by the temperature sensors 42 in step S106 and compares them with predefined threshold values or expected temperature profiles.

For example, the evaluation and control unit 34 is configured to calculate a temperature profile over time per temperature sensor 42 from the temperature data and to compare this temperature profile over time with a predefined, absolute temperature threshold value and/or a predefined temperature profile over time. The predefined, absolute temperature threshold value can, for example, be set to a temperature value that is at least expected if the heating element 50 and the temperature sensor 42 are functioning correctly. If this temperature threshold value is not reached, this is an indication that the corresponding temperature sensor unit 40 is not functioning correctly, since, for example, the heating element 50 and/or the temperature sensor 42 of the respective temperature sensor unit is defective.

By comparing the temperature profile recorded over time by the temperature sensor 42 of the respective temperature sensor unit 40 with a predefined, expected temperature profile over time, the evaluation and control unit 34 can further determine whether the temperature sensor unit 40 is correctly mounted on the measurement head 28 or the guide structure 30 of the measurement device 10.

Figure 6A:
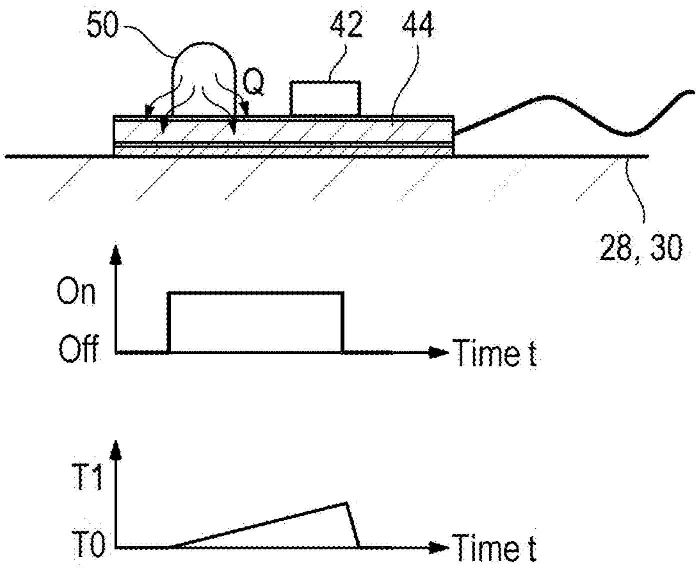
FIGS. 6A and 6B is a schematic illustration to explain a functional check of the temperature sensor.
Figure 6B:
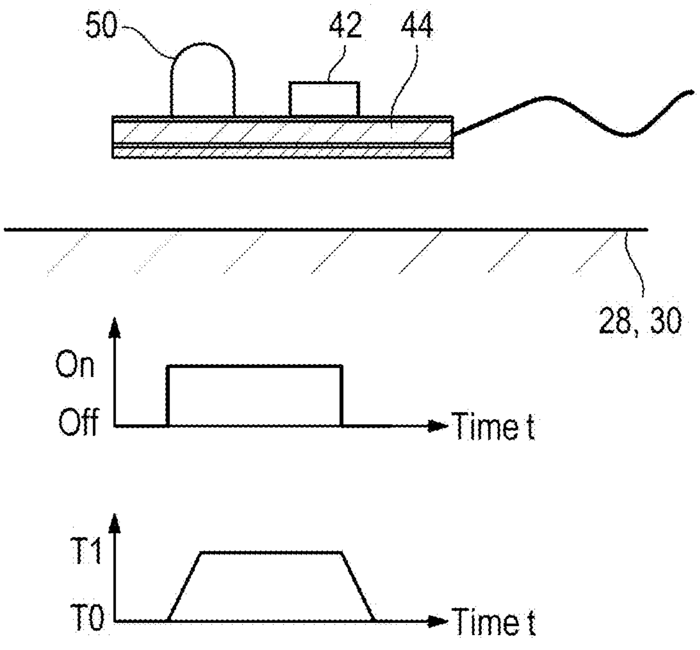

FIGS. 6A and 7B show, by way of example and schematically, an expected temperature profile that the temperature sensor 42 records when the heating element 50 is activated for a predefined period of time, with FIG. 6A showing the case of correct mounting of the temperature sensor unit 40 on the measurement head 28 or the guide structure 30, and FIG. 6B showing the temperature profile captured by the temperature sensor 42 in the event that the temperature sensor unit 40 is not correctly mounted.

If the temperature sensor unit 40 is correctly mounted on the measurement head 28 or the guide structure 30, a significantly lower and slower rise in the temperature detected by the temperature sensor 42 is to be expected. This is because, if the temperature sensor unit 40 is correctly mounted, a significant portion of the heat emitted by the heating element 50 flows into the measurement head 28 or the guide structure 30, with the result that the temperature detected by the temperature sensor 42 rises much more slowly over time and ultimately reaches a lower maximum temperature value (cf. bottom diagram in FIG. 6A with bottom diagram in FIG. 6B).

If, on the other hand, the temperature sensor unit 40 has become detached from the measurement head 28 or the guide structure 30, the temperature captured by the temperature sensor 42 rises significantly faster with the same heating power of the heating element 50 and, due to the lower heat capacity of the temperature sensor unit 40 compared to the heat capacity of the measurement head 28 or the guide structure 30, reaches a higher maximum temperature value more quickly.

The evaluation and control unit 34 can accordingly ascertain whether the respective temperature sensor unit 40 is functioning correctly and is correctly arranged on the measurement device 10 by analyzing the temperature data supplied by the temperature sensors 42 and comparing them with an absolute temperature threshold value and/or by analyzing the profile of the temperature ascertained by the temperature sensors 42 over time.

This functional check of the temperature sensor units 40, carried out in steps S104-S106, can be integrated into the "regular" temperature capture process and temperature correction process, which was illustrated using steps S101-S103. For example, the evaluation and control unit 34 can be configured to carry out this functional check at regular intervals and to issue a fault message if one of the aforementioned defects is determined during the functional check.

If the heating elements 50 are designed as light-emitting element 52, or the temperature sensor units 40 each include a light-emitting element 52 in addition to the heating elements 50, an optical assignment of the temperature sensor units can take place in a simplified manner, as shown below.

For this purpose, the evaluation and control unit 34 is preferably configured to activate the light-emitting element 52 of the temperature sensor units 40 with a mutual time offset. The evaluation and control unit 34 has a plurality of signal channels, wherein each of the signal channels is assigned one of the temperature sensors 42 and wherein each of the signal channels is assigned a second light-emitting element 60 (see FIG. 1), which is configured to light up when the respective signal channel is activated. So if the light-emitting element 52 are activated one after the other, it is possible to determine based on the correspondingly lit second light-emitting element 60 which temperature sensor unit 40 is assigned to which signal channel. During the optical check, it can also be seen immediately whether the temperature sensor 42 selected accordingly by the evaluation and control unit 34 has been mounted on the channel provided therefor or not. If the light-emitting element 52 of a temperature sensor unit 40 does not light up in a time-synchronous manner with the second light-emitting element 60 of the respective signal channel, then the temperature sensor 42 has not been assigned to the correct signal channel of the evaluation and control unit 34. With the aid of a corresponding ID chip, this type of assignment of the temperature sensor units 40 in the evaluation and control unit 34 can also be carried out automatically.

The stated type of optical or automated assignment of the individual temperature sensor units 40 to the signal channels of the evaluation and control unit 34 is advantageous in particular if a large number of temperature sensor units 40 are used on the measurement device 10. This is because, in such a case, the assignment of the temperature sensor units 40 in a conventional manner can usually only be ensured with great effort. However, it is understood that the provision of a light-emitting element 52 per temperature sensor unit 40 is not necessarily required for the aforementioned functional check of the temperature sensor units 40. Accordingly, in the simplest case, the temperature sensor units 40 can also be equipped with "only" a heating element 50 (without light-emitting element 52).

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A measurement device for dimensionally measuring a measurement object located in a measurement volume of the measurement device, the measurement device comprising:

a measurement head configured to capture dimensional measurement data of the measurement object;

a guide structure configured to move and guide at least one of the measurement head and the measurement object in the measurement volume, a measurement unit configured to capture positional data of the guide structure based on which a pose of the measurement head can be calculated;

a plurality of temperature sensor units configured to capture temperature data about the measurement volume, wherein each of the plurality of temperature sensor units includes:

a carrier element, a temperature sensor connected to the carrier element, and a heating element connected to the carrier element; and a control system configured to:

process the dimensional measurement data and the positional data, based on the temperature data, correct at least one of the dimensional measurement data and the positional data, activate the heating elements of the plurality of temperature sensor units, determine a temperature profile over time based on the temperature data, generate an analysis of the temperature profile over time, and determine, based on the analysis of the temperature profile over time, at least one of (i) a defect in at least one of the plurality of temperature sensor units and (ii) an incorrect mounting of at least one of the plurality of temperature sensor units.

2. The measurement device of claim 1, wherein the control system is configured to:

generate a comparison of the temperature data with a predefined, absolute temperature target value, and determine, based on the comparison, the at least one of the defect and the incorrect mounting.

3. The measurement device of claim 1, wherein the control system is configured to:

analyze the temperature profile over time by generating a comparison of the temperature profile over time with a predefined temperature profile over time, and determine, based on the comparison, the at least one of the defect and the incorrect mounting.

4. The measurement device of claim 1, wherein each of the plurality of temperature sensor units includes a light-emitting element.

5. The measurement device of claim 4, wherein, for each unit of the plurality of temperature sensor units, the light-emitting element of the unit forms at least a part of the heating element of the unit.

6. The measurement device of claim 4, wherein the control system is configured to activate the light-emitting elements of the plurality of temperature sensor units with a mutual time offset.

7. The measurement device of claim 1, wherein:

the control system includes a plurality of signal channels, each of the signal channels is assigned one of the temperature sensors, and each of the signal channels is assigned a second light-emitting element that is configured to light up when the respective signal channel is activated.

8. The measurement device of claim 1, wherein, for each unit of the plurality of temperature sensor units:

the carrier element of the unit includes a circuit board, and the temperature sensor and the heating element of the unit are surface-mounted devices on the circuit board of the unit.

9. The measurement device of claim 1, wherein each of the plurality of temperature sensor units includes an attachment element that is configured to attach the carrier element to the measurement device.

10. The measurement device of claim 9, wherein:

the attachment element includes a screw and a nut corresponding with the screw, and the carrier element is connected to the screw.

11. The measurement device of claim 1, wherein each of the plurality of temperature sensor units includes a housing in which the carrier element, the temperature sensor, and the heating element of the respective temperature sensor unit are arranged.

12. The measurement device of claim 1, wherein the plurality of temperature sensor units is attached to at least one of the measurement head and the guide structure.

13. A method for dimensionally measuring a measurement object located in a measurement volume, the method comprising:

capturing dimensional measurement data of the measurement object with a measurement head of a measurement device, capturing positional data based upon which a pose of the measurement head can be calculated;

capturing temperature data about the measurement volume using a plurality of temperature sensor units, each of which includes a carrier element, a temperature sensor connected to the carrier element, and a heating element connected to the carrier element;

based on the temperature data, correcting at least one of the dimensional measurement data and the positional data;

activating the heating elements of the plurality of temperature sensor units, determining a temperature profile over time based on the temperature data, analyzing the temperature profile over time, and determining, based on the analysis of the temperature profile over time, at least one of (i) a defect in at least one of the plurality of temperature sensor units and (ii) an incorrect mounting of at least one of the plurality of temperature sensor units.

14. A non-transitory computer-readable medium comprising instructions including:

capturing dimensional measurement data of a measurement object with a measurement head of a measurement device, capturing positional data based upon which a pose of the measurement head can be calculated;

capturing temperature data about a measurement volume of the measurement device using a plurality of temperature sensor unit that each includes a carrier element, a temperature sensor connected to the carrier element, and a heating element connected to the carrier element;

based on the temperature data, correcting at least one of the dimensional measurement data and the positional data;

activating the heating elements of the plurality of temperature sensor units, determining a temperature profile over time based on the temperature data, analyzing the temperature profile over time, and determining, based on the analyzing, at least one of (i) a defect in at least one of the plurality of temperature sensor units and (ii) an incorrect mounting of at least one of the plurality of temperature sensor units.

* * * * *